March 20, 1951 D. G. ROOS 2,545,795
POWER TRANSMISSION DEVICE
Filed Aug. 12, 1944 3 Sheets-Sheet 3
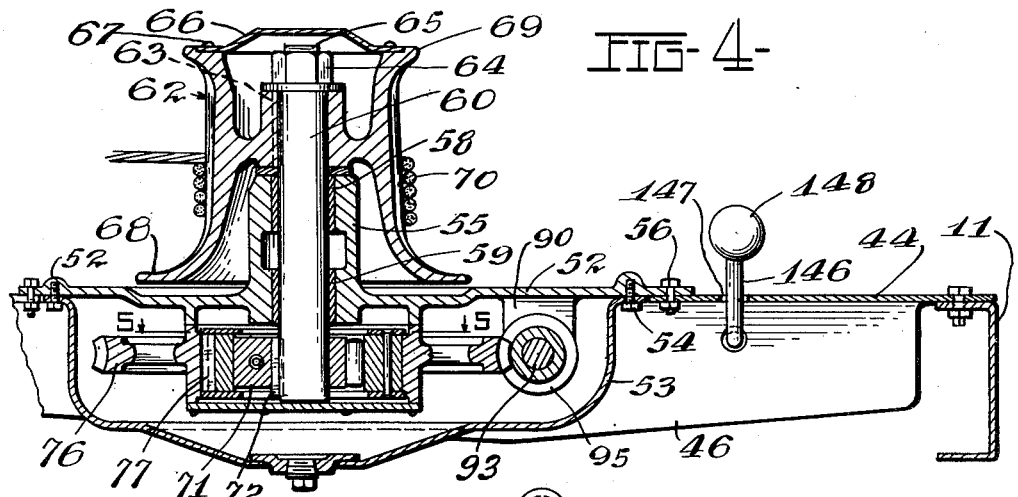
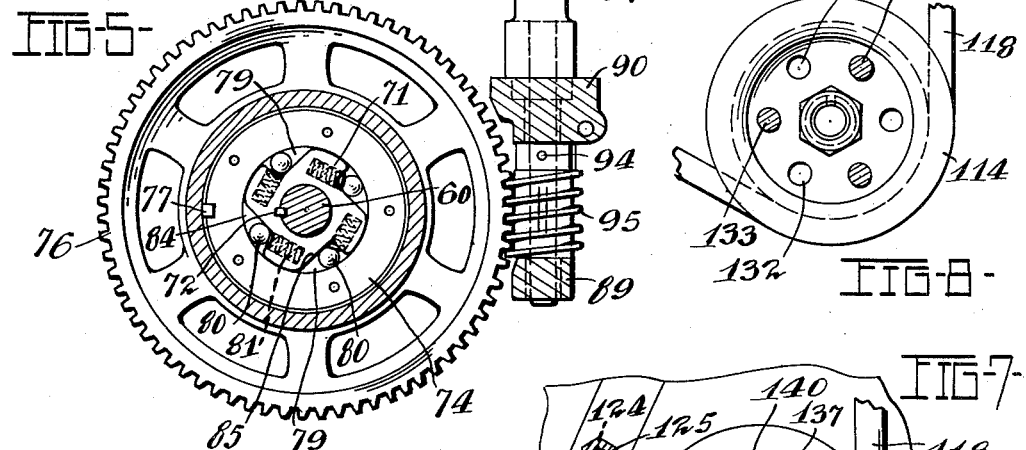
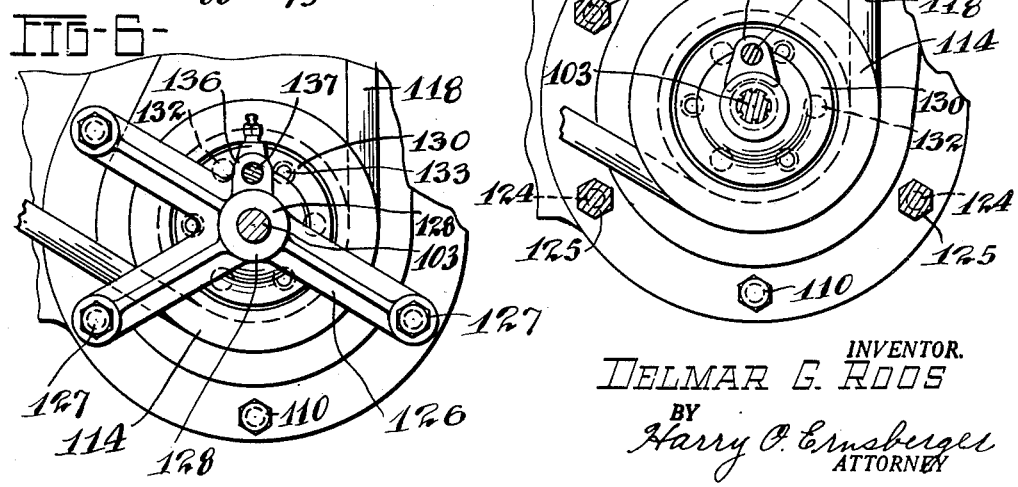
INVENTOR.
DELMAR G. ROOS
BY
Harry O. Ernsberger
ATTORNEY Patented Mar. 20, 1951

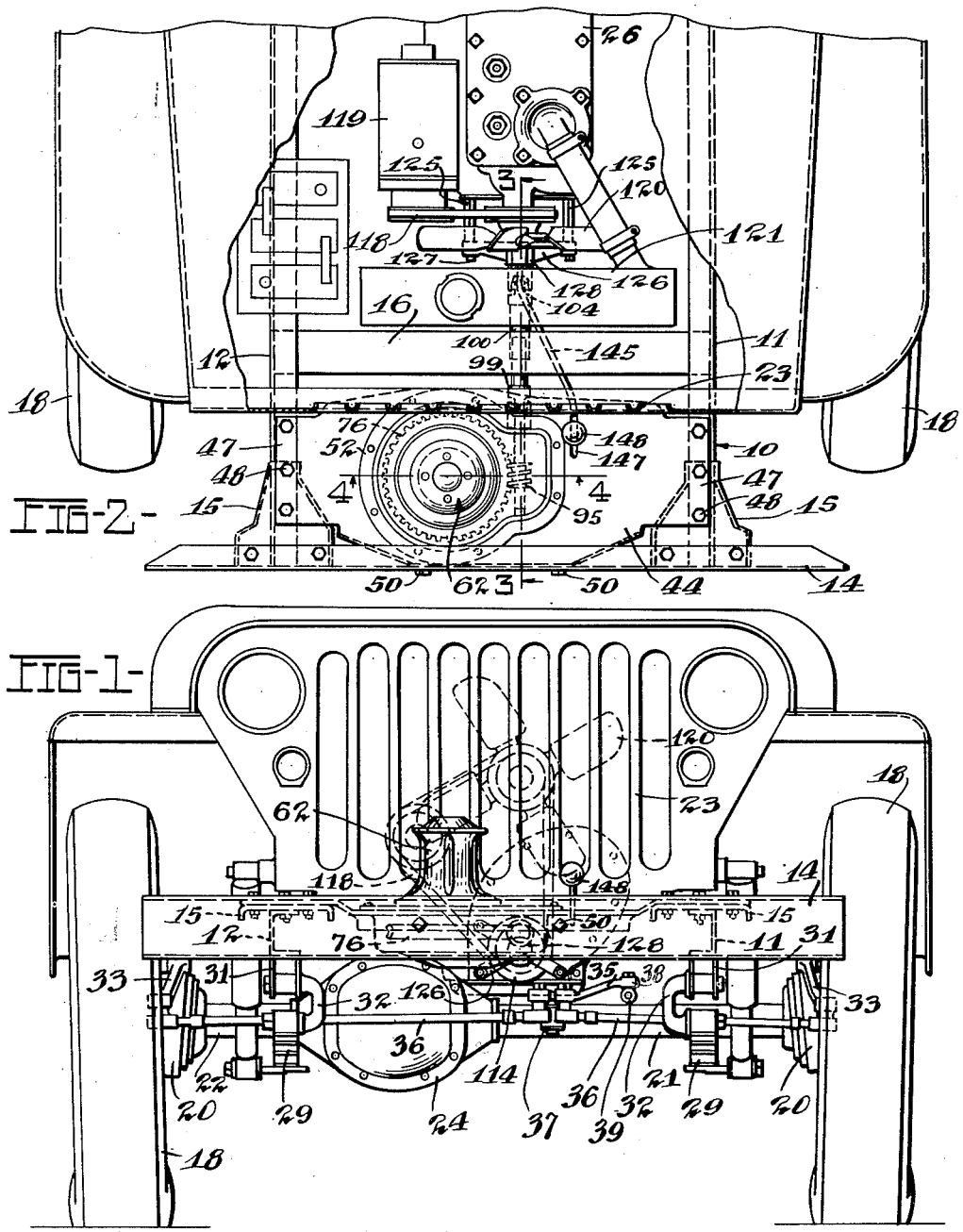

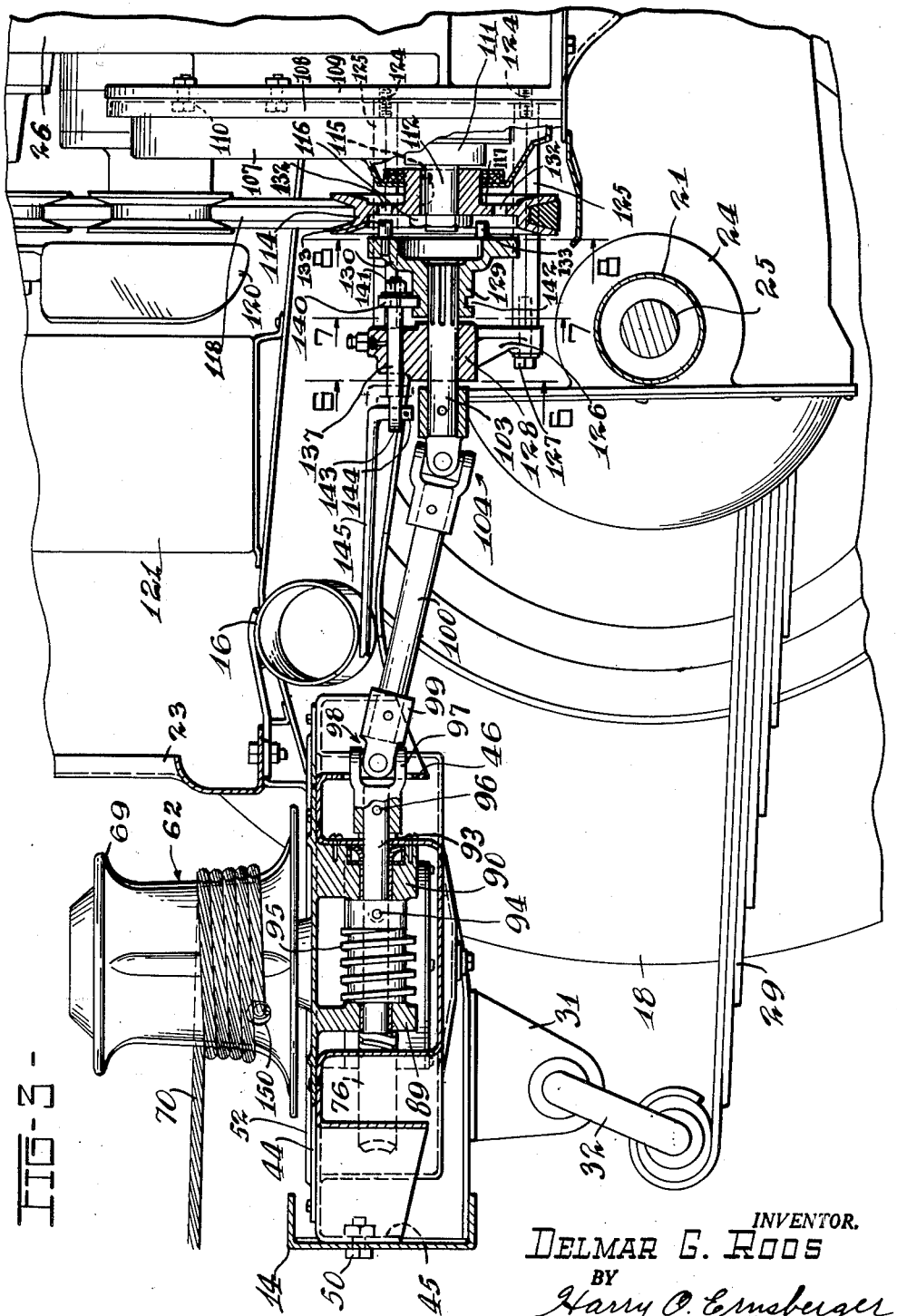

2,545,795

UNITED STATES PATENT OFFICE 2,545,795

POWER TRANSMISSION DEVICE

Delmar G. Roos, Toledo, Ohio, assignor to Willys-Overland Motors, Inc., Toledo, Ohio, a corporation of Delaware Application August 12, 1944, Serial No. 549,210

8 Claims. (Cl. 254—166)

This invention relates to power transmission mechanism and more especially to auxiliary power take-off devices useable with engine driven vehicles without necessitating major modification of the vehicle or its source of power.

The invention embraces the provision of power take-off means which may be applied as a supplemental unit deriving its power from the engine of the vehicle by means engageable with a pulley or other element associated with the engine crankshaft.

The invention contemplates a self-contained or unitary construction which may be readily applied or affixed to vehicles already manufactured with only minor modifications of certain elements of the vehicle.

An object of the invention is the provision of a power operated winch or capstan arrangement which may be readily applied to the forward portion of a vehicle and which derives power for its operation by means adapted to be connected to the pulley or other element projecting exteriorly of the engine and operated by the engine crankshaft.

Another object of the invention resides in the adaptation of simple yet effective means for connecting the reduction gearing of a winch or capstan to a pulley fixed on the extremity of the engine crankshaft whereby the control means therefor is accessible exteriorly of the engine compartment.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a front elevational view of a vehicle embodying my invention;

Figure 2 is a top plan view of the arrangement shown in Figure 1, certain parts being broken away for purposes of illustration;

Figure 3 is an enlarged, longitudinal sectional view taken substantially on the line 3—3 of Figure 2;

Figure 4 is a transverse detail sectional view taken substantially on the line 4—4 of Figure 2;

Figure 5 is a detail sectional view taken substantially on the line 5—5 of Figure 4;

Figure 6 is a fragmentary detail sectional view taken substantially on the line 6—6 of Figure 3;

Figure 7 is a fragmentary detail sectional view taken substantially on the line 7—7 of Figure 3, and Figure 8 is a fragmentary detail sectional view taken substantially on the line 8—8 of Figure 3.

While I have illustrated an arrangement of my invention as especially utilized for operating a capstan or winch, it is to be understood that I contemplate the use of my invention with any mechanism wherein the same may be found to have utility.

Referring to the drawings in detail, the vehicle with which I have illustrated my invention is provided with a frame 10 formed with a pair of longitudinally extending channel-shaped rails 11 and 12 which are connected together at their forward extremities by a bumper bar 14, also of channel-shape, in cross section, through the medium of brackets 15. The frame rails 11 and 12 are also connected together by means of a tubular transverse member 16, the ends of which are welded or otherwise fixedly secured to the side rails. The front wheels 18 of the vehicle are rotatably supported upon spindles which are journalled for dirigible movement upon housings 20 which are formed upon or carried by the outer extremities of axles or housings 21 and 22, the inner ends of the axles being secured to a differential and drive gear casing or enclosure 24. In the particular vehicle illustrated a drive is established through the front wheels by means of drive shafts 25 contained within the axles 21 and 22, a propeller shaft (not shown) connecting the drive gearing in the housing 24 with gearing or transmission mechanism (not shown) which derives its power from an internal combustion engine 26. The axles or housings 21 and 22 are secured to the midportions of longitudinally extending leaf springs 29, the rear ends of the springs being connected to the frame side rails 11 and 12 by means of brackets (not shown) while the forward ends are connected to brackets 31 through the medium of shackles 32, brackets 31 being fixedly secured to the forward portions of frame rails 11 and 12. Arms 33 associated with the wheel supporting spindles are joined to a bell crank 35 by means of tie rods 36. The bell crank is pivotally supported upon a bracket 37 welded or otherwise secured to one of the axle housings 21, one arm 38 of the bell crank being connected by means of a drag link 39 to suitable steering gear mechanism (not shown).

The winch or capstan device is adapted to be driven from the internal combustion engine 26 normally utilized for propelling the vehicle. One of the features of the arrangement of my invention is the adaptation of a power take-off means for operating the winch or other mechanism which may be utilized with vehicles already constructed without involving major changes in the mechanism, the power take-off being derived from an engine driven element normally positioned exteriorly and forwardly of the engine crank case.

The capstan assembly is adapted to be carried or mounted upon a support or plate 44 which is preferably formed of heavy gauge sheet metal having oppositely disposed depending walls or flanges 45 and 46 for purposes of lending strength and rigidity to the supporting element 44. Plate 44 is integrally formed with laterally extending ears 47 adapted to be secured to the frame side rails 11 and 12 by means of bolts 48. The flange or wall 45 of support 44 is secured to the bumper bar 14 by means of bolts 50. The winch assembly is inclusive of a member 52 to which is secured a sheet metal bowl-like housing 53 secured to member 52 by screws 54, member 52 being secured to the plate 44 by means of bolts 56, the support 44 having an opening to accommodate the housing 53. Member 52 is provided with a vertically extending hollow boss portion 55 in which are disposed spaced bearing bushings 58 and 59 within which is journalled a shaft or spindle 60. Secured to the shaft 60 above the boss 55 is a capstan, or drum 62 which is secured upon the shaft 60 by means of a key 63 and a nut 64 threaded upon a tenon 65 formed on the extremity of the shaft. A circular plate 66 encloses the upper portion of the capstan or winch 62, being secured to the latter by means of screws 67. It should be noted that the exterior configuration of capstan 62 is inclusive of a flared lower skirt portion 68 and an upwardly and outwardly flared extremity 69 to properly maintain a rope or cable 70 or other means with which the capstan or winch may be used and which is arranged to be coiled about the exterior periphery thereof. The shaft 60 extends beneath the plate or member 52 and is secured to a hub portion 71 by means of key 72. Surrounding the hub 71 is an annular member 74 which is disposed within a central opening in a worm wheel 76. The annular member 74 and worm wheel 76 are adapted to rotate as a unit, being secured together by means of a key 77.

The hub member 71 is operatively connected with the annular member 74 through the medium of an over-running or one-way clutch means. The hub 71 is formed with a plurality of peripherally arranged, vertical flutes or recesses 79 within which are positioned clutch rollers 80 as particularly shown in Figure 5. The hub 71 is also formed with recesses within which are positioned expansive coil springs 81, each spring being in engagement with a clutch roller 80. The inner cylindrical wall 84 of the annular member 74 together with the angularly disposed walls 85 of the flutes 79 provide converging surfaces which cooperate with the rollers 80 to establish a drive connection between the annular member 74 and the hub 71 in one direction only. With this arrangement, the hub 71 and the winch 62 are free to rotate in only one direction, and this enables an operator to manipulate the winch drum 62 by hand in order to take up quickly any slack in the cable 70.

The plate 52 is formed with a pair of depending bosses 89 and 90 which are bored to receive bearing sleeves within which is journalled a horizontally disposed shaft 93.

Positioned between bosses 89 and 90 and secured upon shaft 93 by means of a pin 94 is a worm 95, the teeth of which are enmeshed with the teeth of worm wheel 76 to drive the latter. Secured to the rear end of shaft 93 by means of a pin 96 is one element or yoke 97 of a universal joint 98. The other yoke 99 of the universal joint or coupling 98 is fixedly secured to a shaft 100, the other end of which is operatively connected to a shaft 103 through the medium of a second universal joint 104 of construction similar to the universal coupling 98.

The forward end of the engine 26 is closed by means of a closure or plate 107 having a peripheral flange 108 adapted to coincide with a flange 109 formed on the engine block, the plate being held in position by means of screws 110. The crankshaft 111 of the engine projects through an opening in the closure 107, the portion 112 of the crankshaft 111 extending exteriorly of closure 107 supporting a pulley 114, the latter being fixedly secured upon portion 112 by means of a key 115. Portion 112 of the crankshaft terminates in a threaded tenon adapted to receive a securing nut 116 which serves to retain the pulley 114 on the crankshaft. The periphery of pulley 114 is of V-shape cross section to accommodate a flexible belt 118 which serves to drive a generator 119 and a cooling fan 120 the latter being disposed rearwardly of a radiator 121.

My invention is inclusive of means for supporting shaft 103 in alignment with axis of crankshaft 111 as shown in Figure 3. In this arrangement three of the screws 110 normally used in securing the closure 107 to the engine block 26 are omitted and replaced by studs 124 threaded into the flange 109. The portions of the studs 124 extending forwardly of flange 108 of the closure are adapted to receive spacing members 125. Mounted upon the extremities of spacing members 125 is a bracket or support 126 which is secured to members 125 by means of headed screws 127. The bracket 126 is provided with a central boss portion 128 which is bored to receive and journally support the shaft 103. The portion of the shaft 103 extending rearwardly of bracket 126 is splined to slidably receive the grooved internal cylindrical configuration of the hub portion 129 of a clutch means or member 130. The web portion 117 of pulley 114 is formed with a plurality of radially arranged, spaced circular openings 132. Clutch member 130 is provided with a plurality of pins or clutching projections 133 which are adapted to engage in certain of the openings 132 when the clutch member 130 is moved to the right as viewed in Figure 3. Engagement of pins 133 in openings 132 in pulley 114 establishes a driving connection of crankshaft 111, pulley 114 with member 130, shafts 93, 100 and 103, so as to effect an operative drive for the capstan or winch 62.

Means are provided for shifting the clutch member or means into and out of engagement with the pulley 114. The bracket 126 is formed with an upwardly extending portion 136 formed with a cylindrical opening arranged in parallelism with shaft 103 and is adapted to receive and slidably accommodate a shaft 137. One end of the shaft 137 is provided with a reduced tenon upon which is secured a yoke 140, the latter being secured to the shaft by means of a nut 141. The yoke 140 projects into a kerf or groove 142 formed in the hub portion 129 of clutch member 130. Longitudinal movement of shaft 137 will cause corresponding movement of clutch member 130 to engage or disengage the same with the pulley 114. The forward extremity of shaft 137 is integrally formed with a flattened portion 143 having an opening into which extends a portion 144 of an operating rod 145. The operating rod 145 extends forwardly and has an upwardly extending portion 146 projecting through a slot 147 formed in the support or plate 44, portion 146 being provided with a manipulating knob or handle 148 which affords a simple manipulating means for the clutch actuating rod 145. It should be noted that the knob 148 is disposed forwardly of the radiator guard or grill 23 in a convenient operating location with respect to the winch 62, the slot 147 in plate 44 being elongated to accommodate lengthwise movement of the clutch control rod 145.

In the operation of the mechanism of my invention, when it is desired or is found necessary to employ the winch means to move or dislodge the vehicle from a mired position, or to move another object, the cable 70 may be secured to a stationary abutment or to the object to be moved, the other end of the cable being introduced into an opening 150 in the wall of the winch or drum 62, the drum 62 may then be rotated manually to take up the slack in the cable, this action being permitted by the over-running clutch mechanism shown in Figure 5. By moving knob 148 rearwardly, the operating shaft 145, shaft 137, yoke 140 and clutch member 130 are moved rearwardly causing the projections 133 to engage in certain of the openings 132 in the pulley 114 to establish a drive connection from the crankshaft 111 to the winch or drum 62 through the medium of shafts 100, 103, universal joints 98, 104, shaft 93, worm 95, worm wheel 76 through the overrunning clutch means to rotate shaft 60 and hence drum 62. The clutching engagement is preferably effected while the engine is idling, but engagement may be accomplished without the engine in operation if projections 133 are in a position to register with openings 132 in pulley 114. A substantial gear reduction is effected through worm 95 and worm wheel 76, so that the drum 62 moves at only a small fraction of the speed of the engine crankshaft 111. Thus the effective pulling power of the drum 62 on the cable 70 is very great.

While I have illustrated the pulley 114 as having six equally spaced radially disposed openings 132 and clutch member 130 provided with three projections 133, any number of openings may be utilized except that the number of openings must equal or exceed the number of clutch projections and be arranged in proper spaced relation with respect to the projections to establish a clutching engagement when desired.

It is apparent that, within the scope of the invention, modifications and different arrangements may be made other than is herein disclosed, and the present disclosure is illustrative merely, the invention comprehending all variations thereof.

What I claim is:

1. In combination, a mobile vehicle; an engine carried by the vehicle and arranged to drive the same; said engine having a rotatable member projecting exteriorly thereof and driven thereby; said rotatable member having a plurality of openings therein; a bracket arranged forwardly of said engine; a plurality of bars supporting said bracket from said engine; a shaft journaled in said bracket; a clutch element slidable along said shaft and having means engageable in the openings in said rotatable member for establishing drive connection between said member and said shaft; a yoke associated with said slidable clutch element; and manually operable means connected to said yoke for shifting the same to move said clutch element to operative or non-operative position.

2. In combination, a mobile vehicle; an engine carried by the vehicle and arranged to drive the same; said engine having a rotatable pulley projecting exteriorly thereof and driven thereby; said pulley having a plurality of openings therein; a bracket arranged forwardly of said engine; a plurality of bars supporting said bracket from said engine; a shaft journaled in said bracket; a clutch element slidable along said shaft and having means engageable in openings in said pulley for establishing a drive connection between said pulley and said shaft; a yoke associated with said slidable clutch element; and manually operable means connected to said yoke and terminating at the forward portion of said vehicle for shifting said clutch element to operative or non-operative position.

3. In combination, a mobile vehicle; an engine carried by the vehicle and arranged to drive the same; said engine having a rotatable member projecting exteriorly thereof and driven thereby; a bracket arranged forwardly of said engine; a plurality of bars mounted upon said engine and supporting said bracket; a shaft journaled in said bracket; a clutch element slidable on and rotatable with said shaft; said clutch element being engageable with said member for establishing a drive connection between said member and said shaft; a yoke carried by said bracket and associated with said slidable clutch element; and means including a rod connected to said yoke and terminating at a position remote from said clutch element for shifting said yoke to actuate the clutch element to operative or non-operative position.

4. In combination; a vehicle frame; an engine mounted thereon adapted to drive the vehicle; said engine having a driven member arranged forwardly and exteriorly thereof; a plurality of bars secured to and extending forwardly of said engine; a bracket mounted upon said bars; a shaft journaled upon said bracket; a clutch member mounted upon said shaft and engageable with said driven member to establish a drive connection from the engine to said shaft; and manipulating means associated with said clutch member for actuating the latter to operative or non-operative position.

5. In combination, a mobile vehicle having a frame; said frame including side rails; an engine carried by said frame and arranged to drive said vehicle; said engine having a revoluble member extending forwardly and exteriorly thereof; a plate-like member connecting said side rails and disposed ahead of said engine; a work performing unit non-adjustably mounted upon said plate-like member; said work performing unit including a housing enclosing power transmission gearing; a bracket secured to said engine and disposed forwardly thereof; a stub shaft journaled on said bracket; clutch means associated with said stub shaft and arranged for interconnection with said revoluble member whereby said stub shaft may be driven by said engine independently of the mobility of the vehicle; and means including a drive shaft and universal joint mechanism connecting said stub shaft with the power transmission gearing.

6. In combination, a vehicle frame; an engine carried thereby having a revoluble member extending forwardly and exteriorly thereof; a plate-like support mounted upon said frame and arranged forwardly of the engine; a housing secured to said support; speed reducing gearing enclosed in said housing; a vertically disposed capstan arranged above said housing and driven from said speed reducing gearing; a clutch element disposed adjacent to said revoluble member and slidably movable into engagement therewith; means including a shaft connecting said clutch element and said speed reducing gearing for establishing a drive connection for said capstan, and a clutch shifting member associated with said clutch element and terminating in a manipulating portion positioned adjacent said capstan.

7. In combination, a mobile vehicle having a frame; an engine carried thereby and arranged to drive the vehicle; said engine having a revoluble member extending exteriorly thereof; a vertically disposed capstan mounted on said frame; a housing arranged beneath said capstan; reduction gearing associated with said capstan and disposed in said housing; a clutch element disposed adjacent to said revoluble member and slidably movable for interlocking engagement with said revoluble member; means including a shaft connecting said element and said reduction gearing for establishing a drive connection to said capstan; said means including a drive shaft and universal joint connections; and clutch actuating means having a manipulating portion disposed adjacent said capstan.

8. In combination, a vehicle frame; an engine carried thereby having a revoluble member extending forwardly and exteriorly thereof; a plate-like support mounted upon said frame and arranged forwardly of the engine; a housing secured to said support; speed reducing gearing enclosed in said housing; a vertically disposed shaft projecting upwardly from said housing and arranged to be driven at a comparatively low speed from said speed reducing gearing; a capstan mounted upon said vertically disposed shaft; means for establishing a driving connection between said revoluble member and said speed reducing gearing including a driving shaft; a clutch associated with said shaft and movable into engagement with said revoluble member; and a clutch shifting member operatively connected to said clutch and terminating in a manipulating portion positioned adjacent said capstan.

DELMAR G. ROOS.

REFERENCES CITED

The following references are of record in the file of this patent:

UNITED STATES PATENTS

| Number | Name | Date |
|---|---|---|
| 796,205 | Graham et al. | Aug. 1, 1905 |
| 1,194,994 | Gramm | Aug. 15, 1916 |
| 1,258,807 | Pietzsch | Mar. 12, 1918 |
| 1,260,950 | Bagi | Mar. 26, 1918 |
| 1,316,530 | Basel | Sept. 16, 1919 |
| 1,326,557 | Wilson | Dec. 30, 1919 |
| 1,509,385 | Whatley | Sept. 23, 1924 |
| 1,627,126 | Tamini | May 3, 1927 |
| 1,958,086 | Heus et al. | May 8, 1934 |
| 2,027,638 | Forsberg et al. | Jan. 14, 1936 |

FOREIGN PATENTS

| Number | Country | Date |
|---|---|---|
| 464,576 | Germany | Aug. 24, 1928 |